Dec. 29, 1931.  J. KUCHAR  1,838,412
VEHICLE
Filed April 2, 1930  3 Sheets-Sheet 1
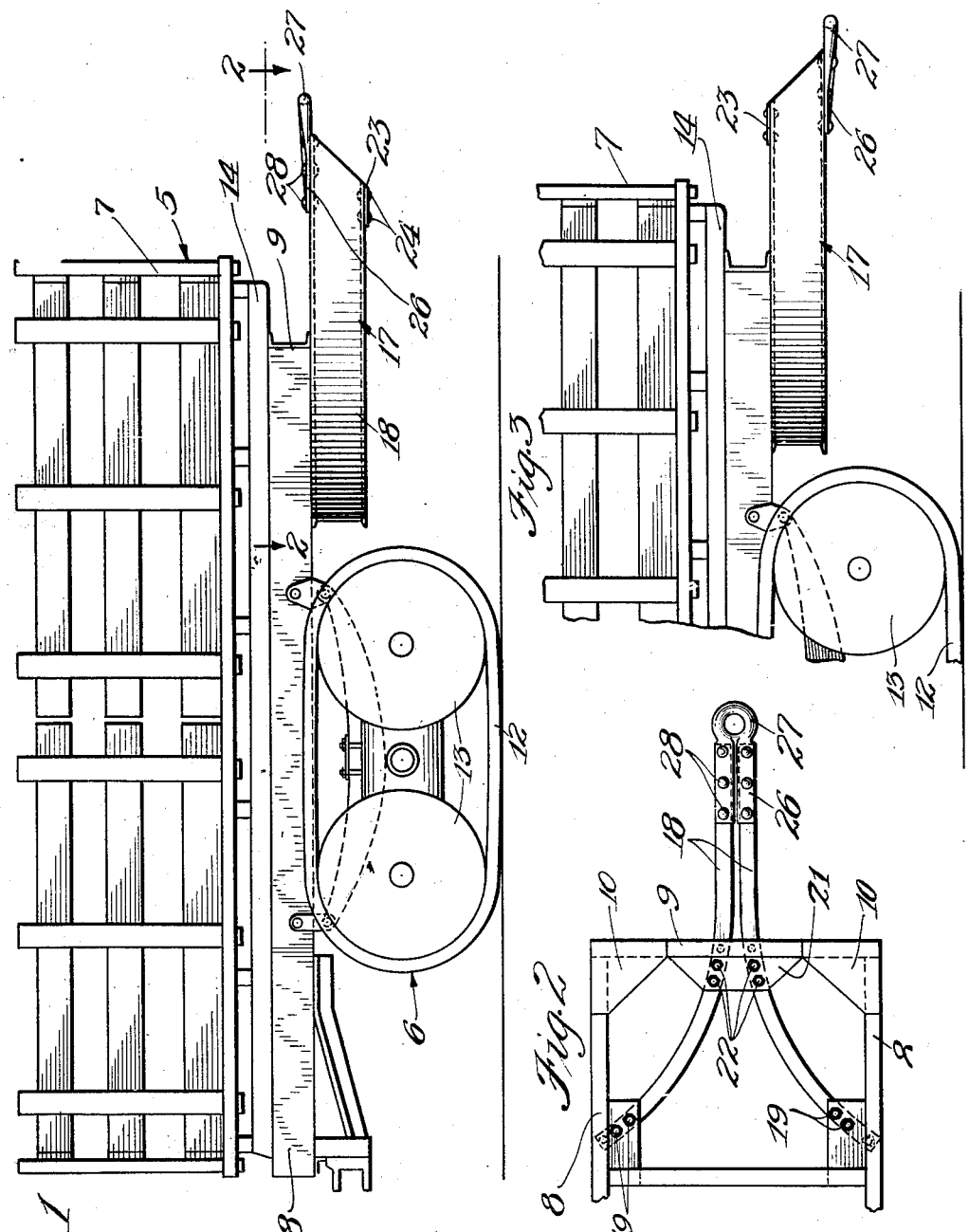
Inventor:
Joseph Kuchar
By Williams, Bradbury, McCaleb & Hinkle
Attys.

Dec. 29, 1931.  J. KUCHAR  1,338,412
VEHICLE
Filed April 2, 1930    3 Sheets-Sheet 2
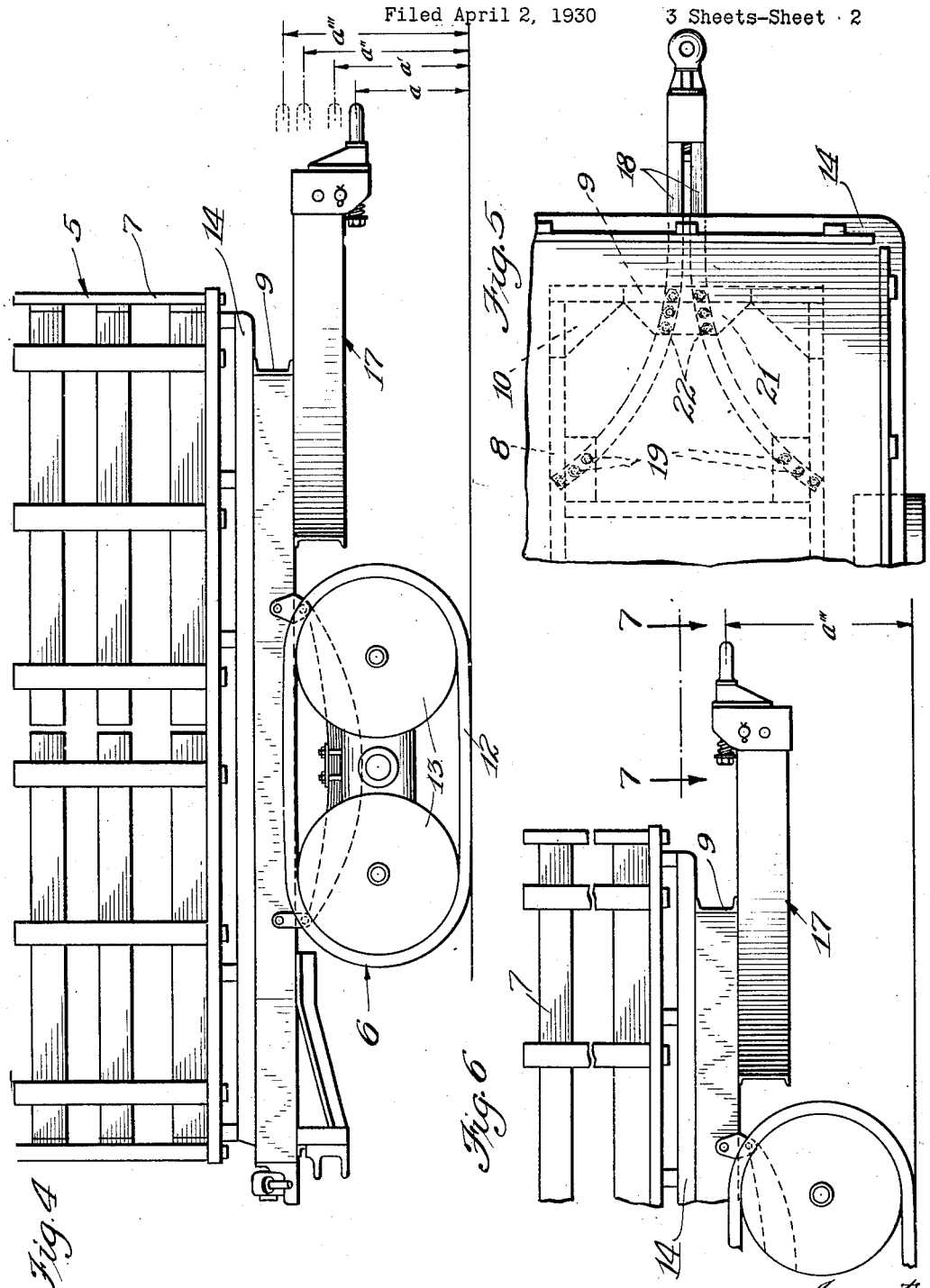

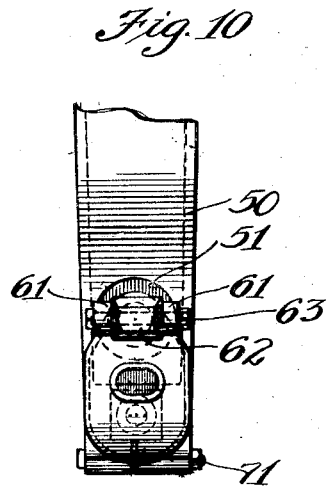
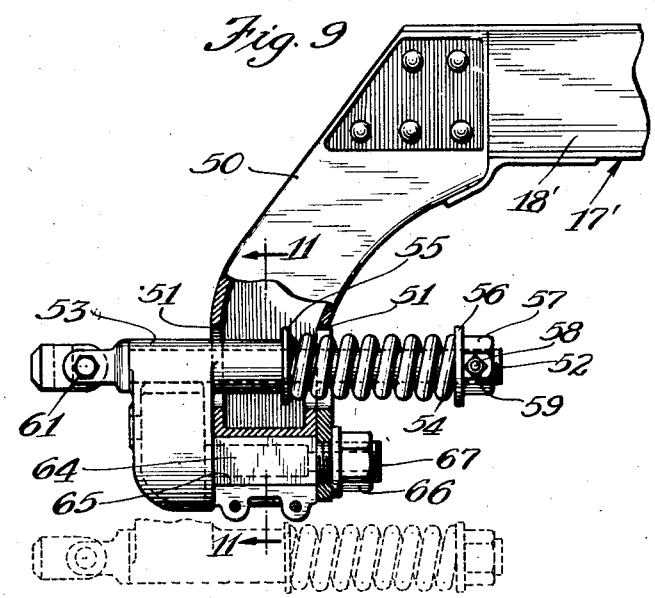
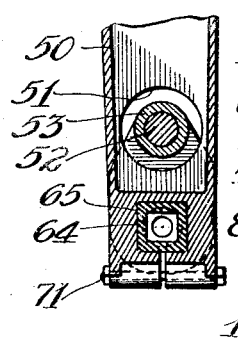
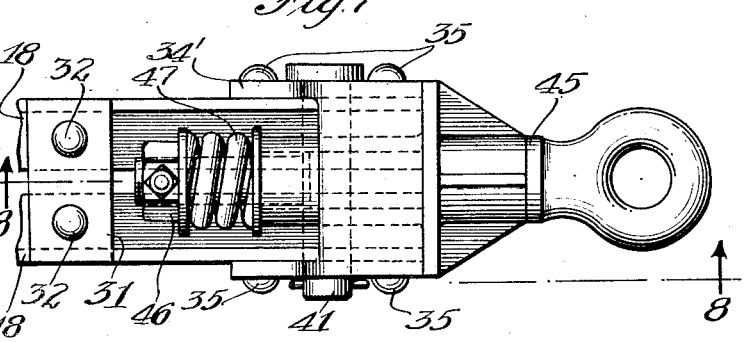
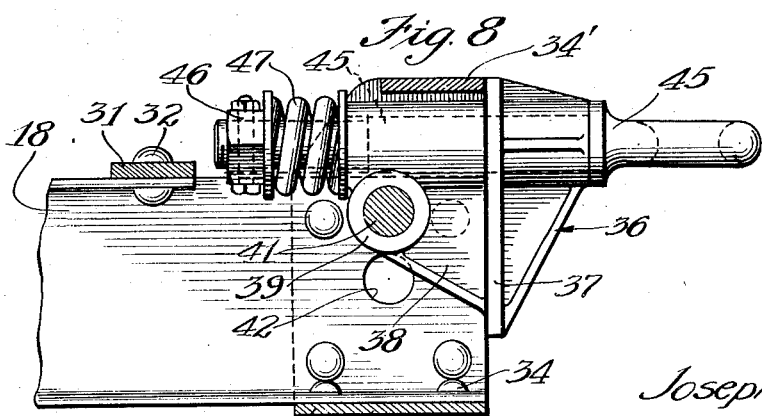

Patented Dec. 29, 1931

1,838,412

UNITED STATES PATENT OFFICE

JOSEPH KUCHAR, OF CHICAGO, ILLINOIS, ASSIGNOR TO ATHEY TRUSS WHEEL CO., OF CHICAGO, ILLINOIS, A CORPORATION OF ILLINOIS

VEHICLE

Application filed April 2, 1930. Serial No. 440,890.

This invention relates to vehicles and more particularly to a hitch for attaching a tractor or other vehicle to a trailer for conveying it from place to place.

An object of my invention is the provision of a hitch for a trailer so constructed that it may be adjusted in its height from the ground to be readily adapted for connection with a draw bar of a tractor or other vehicle which may have a height different from that of the trailer which it is desired to have it convey.

Another object is the provision of such a device having a yieldable draw bolt to absorb shocks caused by sudden starting of the drawing vehicle.

In the accompanying drawings:

Fig. 1 is a side elevation of a trailer showing my invention incorporated therein;

Fig. 2 is a fragmentary plan view of the vehicle frame and draw bar and taken on the line 2—2 of Fig. 1;

Fig. 3 is a view similar to Fig. 1 but showing the draw bar inverted to change the height of the hitch;

Fig. 4 is a side elevation of a trailer incorporating a modified form of my invention;

Fig. 5 is a fragmentary plan view of that shown in Fig. 4;

Fig. 6 is a fragmentary elevation similar to Fig. 4 but showing the draw bar in inverted position;

Fig. 7 is a plan view of the front portion of the draw bar and the hitch shown in Fig. 6 and taken on the line 7—7 thereof;

Fig. 8 is a vertical section taken substantially on the line 8—8 of Fig. 7;

Fig. 9 is a fragmentary side elevation of a modified form of draw bar and hitch incorporating my invention, certain parts thereof being shown in section to more clearly illustrate the construction thereof;

Fig. 10 is a fragmentary front elevation of that shown in Fig. 9; and

Fig. 11 is a vertical section taken on the line 11—11 of Fig. 9.

Referring first to Figs. 1, 2 and 3, I have illustrated a vehicle 5 consisting of a chassis 6 and a body 7 mounted thereon. The chassis comprises a frame having side beams 8 and a front cross beam 9 which are secured together at the corners in any suitable manner and reinforced by triangular corner plates 10. The chassis comprises suitable track laying means such as a caterpillar tread 12 directed and controlled by wheels 13 which are shown only diagrammatically since the details thereof are no part of this invention.

The body 7 comprises a load carrying bed 14 which is suitably fixed to the chassis frame. Beneath the front portion of the chassis frame is fixed a draw bar 17 comprising two curved channel members 18, the rear ends of which are fixed to the frame members 8 by bolts 19. The channel members 18 converge toward the front and pass beneath the front cross beam 9 and the reinforcing plate 21 to which they are secured by bolts 22. The forward ends of the channels 18 extend substantially parallel to each other and are secured in spaced relation by a reinforcing plate 23 which is riveted thereto at 24. The upper sides of the channels 18 in the position shown in Fig. 1 are secured in spaced relation and to the shank 26 of the draw bolt 27 by rivets 28. In this form of my invention the draw bolt is adapted to be selectively positioned at either of two heights from the ground which may be accomplished as shown in Figures 1 and 3 by simply removing the bolts 18 and 22 and inverting the draw bar.

In Figs. 4 to 8 inclusive is illustrated a modified form of my invention comprising a body 7 and a chassis 6 as heretofore described. The draw bar 17 similarly consists of the curved converging channels 18 which are secured in the manner above set forth by means of bolts 19 and 22 and is likewise adapted to be inverted as will be apparent from a comparison of Figures 4 and 6. Adjacent the front ends of the channels 18 is secured a plate 31 for holding the channels 18 in spaced relation by means of rivets 32. On the under side of the channels 18, as illustrated in Fig. 8, a similar reinforcing plate 33 is fixed thereto by rivets 34. At the front end of the draw bar is fixed a hood 34' to the outer sides of the channels 18 by rivets 35. A bracket 36 having a flange 37 engaging the front end of the draw bar includes a rearwardly extending web portion 38 having a boss 39 thereon provided with a laterally extending opening adapted to accommodate a bolt 41 which bolt also passes through aligned openings in the web 34 and the webs of the channels 18 for securing the bracket 36 from longitudinal movement relative to the draw bar. The bracket 36 may be adjusted vertically be removing the bolt 41 and placing the opening through the boss 39 into alignment with the openings 42 vertically beneath the openings in which it is shown positioned in Fig. 8.

The bracket 36 is provided with a longitudinal bore through which is fitted the draw bolt 45 having a nut 46 on the rear end and a coil spring 47 interposed between the nut and the bracket for permitting the draw bolt to yield forwardly a slight amount relative to the bracket in order to absorb shocks caused by sudden starting of the drawing vehicle. The construction shown in Figs. 4 to 8 provides four different heights for the draw bolt above the ground as diagrammatically illustrated in Fig. 1 and designated by dimension arrows and the letters $a$, $a'$, $a''$, and $a'''$.

In Figures 9, 10 and 11 is illustrated another form of my invention comprising a draw bar 17' consisting of the usual channel members 18' which are suitably and rigidly secured to a casting 50 forming a downwardly extending front end portion of the draw bar. Through the casting 50 are provided aligned openings 51 through which is adapted to pass a draw bolt 52 which also passes through an opening in a bracket 53. A coil spring 54 is interposed between washers 55 and 56 respectively engaging the bracket 53 and the nut 57 on the draw bolt 52. In order to prevent the accidental removal of the nut 57 it is provided with an opening in alignment with a similar opening through the bolt 52 and through said openings is fitted a small bolt 58 having a nut 59 on the end as shown in Fig. 9. The forward end of the bolt 52 is forked at 61 as best shown in Fig. 10 and receives a draft element 62 between the forked members where it is suitably secured by a bolt 63. The bracket 53 is provided with a rearwardly extending squared portion 64 which passes through a squared opening 65 in the lower end of the casting 50 forming a portion of the draw bar 17'. The bracket 53 is held in place by a nut 66 on a reduced threaded portion 67 of the rearwardly extending squared portion 64 of the bracket. The casting 50 is preferably split through the bottom edge to facilitate the insertion and removal of the portion 64 of the bracket. Suitable bolts 71 passing through the bottom edge of the casting 50 are adapted to slightly spring the casting into firm contact with the squared portion 64 for firmly holding it in place when adjusted to its desired position.

Referring to Fig. 9 it will be seen that the bracket 53 may be readily removed from the casting 51 and replaced and secured in such a position that the draw bolt 52 will have a different height from that shown in full lines and will be positioned below the end of the draw bar as indicated in broken lines. This construction permits considerable yielding movement of the draw bolt longitudinally relative to the draw bar and is particularly suitable for conveying relatively heavy loads and for coupling with the draw bar on a tractor or other vehicle which may require adjustment of the height of the draw bolt.

It will be understood by those skilled in the art that other variations and modifications may be devised for accomplishing the same purposes herein set forth and I desire to avail myself of such modifications as come within the scope of the appended claims.

I claim as my invention:

1. In a vehicle in combination a draw bar comprising spaced channel members, a hood on the forward end of said members securing them in spaced relation, said channel members and said hood having a plurality of vertically spaced aligned openings, a bracket comprising a web portion fitted between said members, a flange on said bracket seated on the front ends of said members, and on the forward edge of said hood, said bracket having two openings therethrough at right angles to each other, a bolt passing through said bracket and through the aligned openings in said members and said hood for rigidly and adjustably securing said bracket to said members, and a draw bolt secured in the other opening in said bracket.

2. In a vehicle in combination a draw bar comprising spaced channel members, a hood on the forward end of said members securing them in spaced relation, said channel members and said hood having a plurality of vertically spaced aligned openings, a bracket comprising a web portion fitted between said members, a flange on said bracket seated on the front ends of said members, and on the forward edge of said hood, said bracket having two openings therethrough at right angles to each other, a bolt passing through said bracket and through the aligned openings in said members and said hood for rigidly and adjustably securing said bracket to said members, and a draw bolt passing through said bracket, and means yieldingly restraining relative longitudinal movement of said bracket and said draw bolt.

3. In a vehicle in combination a draw bar comprising spaced channel members, a hood on the forward end of said members securing them in spaced relation, said channel members and said hood having a plurality of vertically spaced aligned openings, a bracket comprising a web portion fitted between said members, a flange on said bracket seated on the front ends of said members, and on the forward edge of said hood, said bracket having two openings therethrough at right angles to each other, a bolt passing through said bracket and through the aligned openings in said members and said hood for rigidly and adjustably securing said bracket to said members, and a draw bolt passing through said bracket, a nut on one end of said bolt and a coil spring interposed between said nut and said bracket to permit relative longitudinal movement of said bracket and said draw bolt.

In witness whereof, I hereunto subscribe my name this 29 day of March, 1930.

JOSEPH KUCHAR.